April 6, 1948. C. V. DI PIETRO 2,439,042
METHOD AND APPARATUS FOR STERILIZING GLASSES, DISHES, OR THE LIKE
Filed Jan. 8, 1945 2 Sheets-Sheet 1

INVENTOR.
Carmelo V. Di Pietro
BY
Harold E. Stonebraker
his Attorney

April 6, 1948.  C. V. DI PIETRO  2,439,042
METHOD AND APPARATUS FOR STERILIZING GLASSES, DISHES, OR THE LIKE
Filed Jan. 8, 1945  2 Sheets-Sheet 2
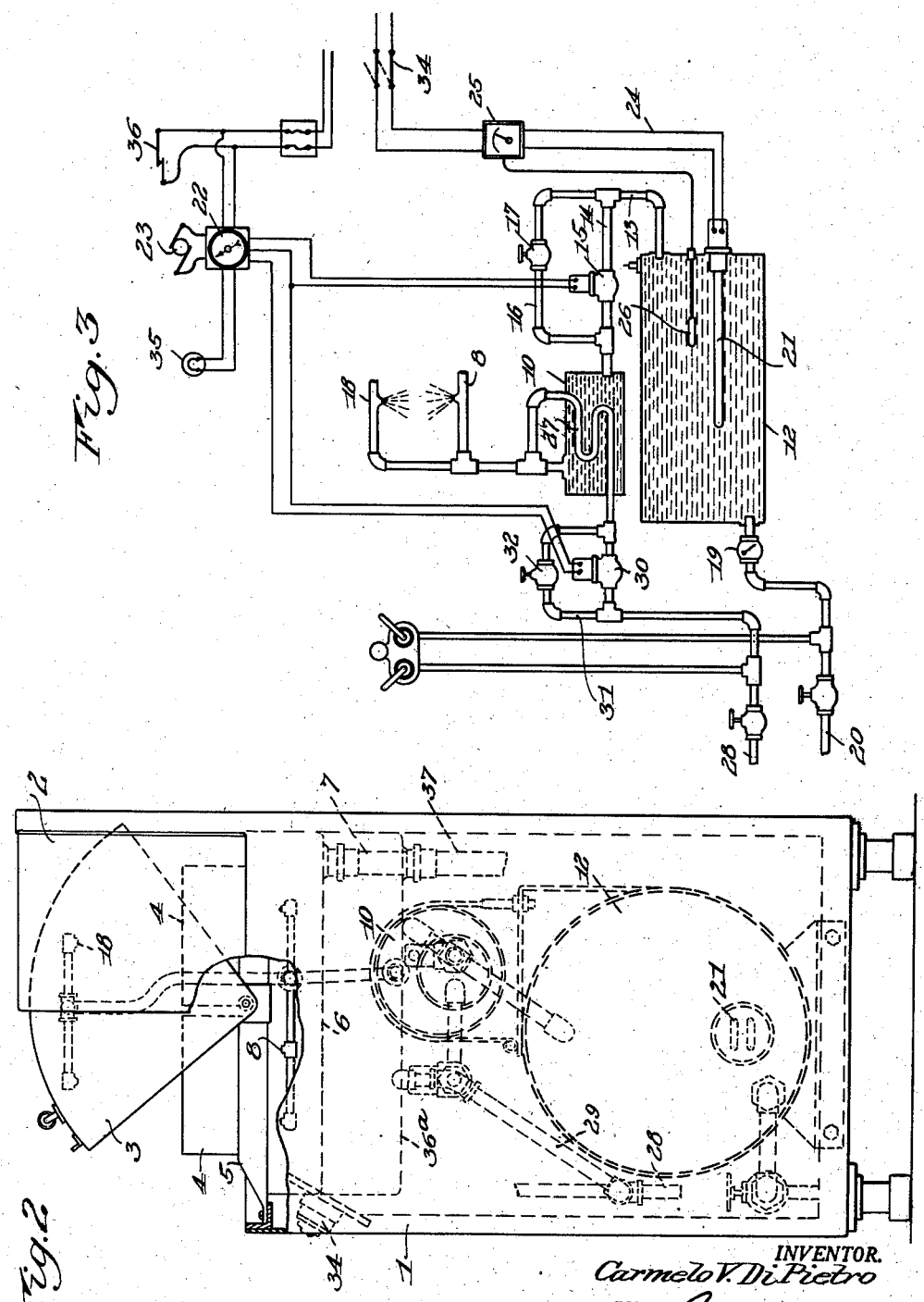
INVENTOR.
Carmelo V. Di Pietro
BY Harold E. Stonebraker
his Attorney Patented Apr. 6, 1948

2,439,042

UNITED STATES PATENT OFFICE 2,439,042

METHOD AND APPARATUS FOR STERILIZING GLASSES, DISHES, OR THE LIKE

Carmelo V. Di Pietro, Birmingham, Mich., assignor to Richardson Corporation, Rochester, N. Y., a corporation of New York Application January 8, 1945, Serial No. 571,793

4 Claims. (Cl. 21—2)

This invention relates to a method and apparatus for sterilizing and cooling glasses, dishes, or the like, with particular reference to the sterilization of glass steins, and has for its object to afford a procedure and mechanism whereby glasses can be thoroughly sterilized and thereafter quickly cooled to a point where they are ready for immediate use.

More specifically, the invention has for its purpose to provide mechanism in which a tray of steins or glasses can be subjected to a spray of water at any high temperature required to sterilize and for a predetermined period of time, after which the supply of sterilizing water is automatically cut off and the glasses subjected to a spray of cooling water for a predetermined period of time, both the sterilizing and cooling operations being performed in such manner as to insure against breakage due to glasses being subjected to excessively sudden changes in temperature.

Another purpose of the invention is to afford a structure in which during the sterilizing cycle the glasses are initially subjected to water at a lower temperature, the temperature of the water being gradually increased until the necessary sterilizing temperature is reached, and upon completion of the sterilizing cycle and during the cooling cycle, the dishes are initially subjected to water at a higher temperature and the temperature of the water gradually lowered until it reaches that of the normal cold water in the supply pipe, thus changing the temperature of the glasses gradually from cold to hot and back to cold, so that they can be thoroughly sterilized and cooled in a short space of time and are then ready for immediate use without further attention.

An additional object of the invention is to afford a construction including a tempering chamber affecting both the sterilizing and cooling water which are in heat-exchange relation therewith, the cooling water passing through a conductor that preferably extends through the tempering chamber and is surrounded by the sterilizing water, so that the cooling water in its conductor functions to lower the temperature of the hot water during the initial part of the sterilizing cycle, while the hot water functions during the initial part of the cooling cycle to raise the temperature of the cooling water, thus maintaining a balance between the extreme hot and cold temperatures and preventing the glasses from being subjected to an excessively sudden change from hot to cold, or vice versa.

Still another object of the invention is to provide practical and efficient mechanism that can be economically constructed, occupies a minimum floor space, and lends itself successfully to the sterilizing of glasses, steins, and dishes upon inserting a tray of glasses into the machine and closing a cover, whereupon mechanism is set in motion which functions automatically to spray water on the glasses and complete the sterilizing and cooling operations successively, after which the spraying of water automatically stops, and upon opening the cover, the glasses can be removed for immediate use in the serving of beverages or food.

To these and other ends, the invention consists in the construction and arrangement of parts that will appear clearly from the following description when read in conjunction with the accompanying drawings, the novel features being pointed out in the claims following the specification.

In the drawings:

Fig. 2 is an end elevation of the same, and

Fig. 3 is a diagrammatic view of the parts.

Figure 1:
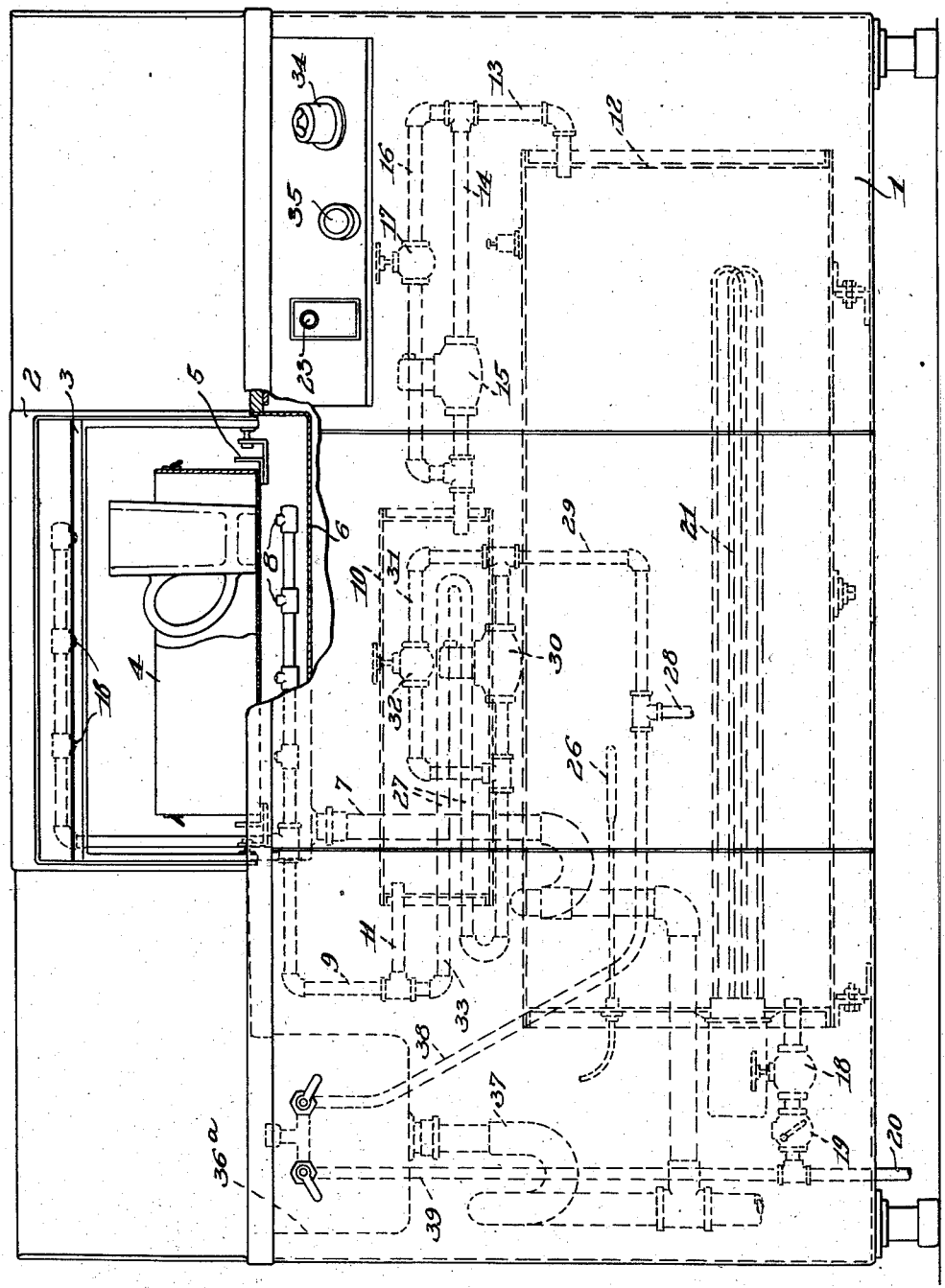
Fig. 1 is a front elevation of a machine constructed in accordance with a preferred embodiment of the invention and showing the cover in open position.

Referring more particularly to the drawings in which like reference numerals refer to the same parts throughout the several views, the structure includes a cabinet or housing 1 at the top of which is arranged a hood 2 and a pivoted cover 3 which when moved to its uppermost position permits inserting a basket or tray 4 containing the glasses, steins, or dishes, such basket being supported on suitable brackets 5.

When the cover 3 is swung to its lowermost position, it combines with the hood 2 to form a closed compartment within which the sterilizing and cooling operations take place. The bottom of the sterilizing compartment is indicated at 6, while 7 designates a drain pipe from which the water is carried off from the sterilizing compartment.

Water is sprayed or otherwise discharged against the glasses or dishes from the top and bottom of the sterilizing compartment through suitable nozzles or jets 8 which are connected with an inlet pipe 9 to which water is supplied for sterilizing and cooling respectively, in the manner that will now be described.

In the structure shown, water for sterilizing is admitted to the jets 8 through pipe 9 from a tempering chamber 10, the hot water passing from the tempering chamber to the inlet pipe 9 through a connecting pipe 11. The sterilizing water is fed to the tempering chamber 10 from a main heating supply tank 12, connected with the tempering chamber 10 by means of a pipe 13, having a branch 14 within which is located an electrically operated solenoid valve 15, while 16 designates a by-pass around the solenoid valve 15, the by-pass 16 including a manual valve 17 adapted to permit manual control of the sterilizing water if the electrically operated solenoid valve should fail.

The main heating supply tank 12 is supplied with water through a valve connection 18 and check valve 19 from a water supply pipe 20 which is preferably a hot water line as it is more economical and efficient to supply the apparatus with previously heated water which is then raised to the required sterilizing temperature, although the machine can be operated from a cold water supply line.

Located within the main heating supply tank 12 is an electric heating unit 21 which may be of any conventional structure and operates to raise the temperature of the water within the tank 12 quickly to a temperature of 180° F., or to whatever temperature may be desired for the sterilizing action. In some cities, it is necessary that dishes be subjected to water at a temperature of 180° F. for a period of two minutes and this is within the sphere of operation of the machine, although the temperature of the sterilizing water and the period of time during which the dishes are subjected to its action may be varied, depending on the changing needs or requirements.

The solenoid valve 15 is controlled by a suitable electric timing mechanism indicated at 22, which may be of any conventional construction and adjustable to give the desired period of operation, to open the valve and close it at the end of the predetermined period. The timer 22 is controlled by a suitable manual switch 23 which is located in the valve control circuit and operated to set the machine in motion, after which the sterilizing and cooling cycles are automatically completed and the valves closed, as will be described presently, and included in the main heating circuit 24 which includes the electric heating unit 21, see Fig. 3, is a thermostatically controlled switch 25 governed by a thermostat 26 located within the tank 12 and acting to maintain the water within the tank at the required temperature.

In operation, when the timer switch 23 is closed, the timer automatically operates the solenoid to open valve 15 and permit hot water to flow from the main heating supply tank 12 to the tempering chamber 10 and thence to the jets or nozzles in the sterilizing compartment for spraying against the glasses or dishes. This continues for the predetermined period, at the end of which time the solenoid valve 15 is automatically closed to stop the sterilizing operation and the parts set in action to effect the cooling operation.

It is desirable when the sterilizing water first strikes the glasses, that it be at a temperature considerably under its maximum temperature so as to reduce the effect of the hot water on the glasses and prevent breaking or cracking, and when the sterilizing operation has been completed, it is desirable to subject the glasses to the action of cooling water and to introduce such cooling water at an initial temperature considerably above its maximum temperature so as not to chill the dishes too suddenly.

These results are accomplished by causing the hot water to pass through the tempering chamber after it leaves the main heating supply tank, and also by bringing the cooling water into heat-exchange relation with the tempering chamber as by passing it through a conductor located within the tempering chamber, although this can be effected in other ways as well. In this fashion, the cold water conductor in the tempering chamber acts to reduce the initial temperature of the hot water passing to the glasses and causes the temperature of the water to be elevated gradually until it reaches the required maximum, and the hot water in the tempering chamber also raises the initial temperature of the cooling water in the cold water conductor so that the cooling water which is first brought in contact with the dishes is at a temperature considerably above its minimum and the drop in temperature of the cooling water taking place gradually until the normal temperature of the cold water is reached.

To attain this, cooling water is supplied to a conductor or coil 27 located within the tempering chamber 10, and connected with the cold water inlet 28 by means of a pipe 29 having one branch provided with the electrically controlled solenoid valve 30 and a by-pass 31 extending around the valve 30 and provided with a manual valve 32 by which the cold water supply can be controlled if the solenoid valve 30 fails. The solenoid valve 30 is controlled from the aforementioned electric timing mechanism 22, which operates the solenoid to open valve 30 upon the closing of the hot water valve 15, the cold water valve 30 remaining open for a predetermined length of time determined by the adjustable timing mechanism, after which the valve 30 is closed and the glasses can be removed, ready for instant serving.

The cold water conductor 27 within the tempering chamber 10 is connected with inlet pipe 9 by means of the pipe 33, to feed cooling water to the spray nozzles, after the hot sterilizing water has been shut off, and since the conductor 27 through which the cooling water passes is located within the tempering chamber 10 and surrounded by hot water from the main hot water supply tank 12, the cooling water passing through conductor 27 is heated somewhat by the surrounding hot water and thus brought to a temperature somewhat above its minimum temperature before coming in contact with the glasses. The cooling water in conductor 27 has a reverse effect on the surrounding hot water and reduces its temperature, so that the initial supply of hot sterilizing water is somewhat below its maximum temperature when it comes in contact with the glasses. The effect of the tempering chamber therefore is to cause the hot water to contact the glasses initially at a lower temperature and to be gradually elevated to its maximum temperature, while during the cooling action, the cooling water contacts the glasses initially at a higher temperature and is gradually reduced to its minimum temperature, and excessively sudden changes in temperature of the glasses is prevented.

With this method of operation and control of the water temperatures, it is possible to place a number of glasses, steins, or dishes in a tray, insert the tray in the sterilizing compartment, and close the cover, after which upon operating the controlling switch, the glasses are automatically subjected to water at the sterilizing temperature for the required time, then automatically subjected to cooling water for the required time, after which the tray of glasses can be removed and placed upon a serving counter ready for immediate use without further attention of any mind. The temperatures of the sterilizing and cooling water are controlled so that they tend to balance each other at the beginning of each sterilizing or cooling cycle.

The main switch controlling the line to the electric heating unit 21 is indicated at 34 while 35 indicates a pilot light which is located in the timer circuit and operable to give an indication when both valves are closed and the cycles are completed. 36 designates a switch located in the timer circuit and arranged for operation by the cover 3 to close the circuit when the cover is closed and to open the circuit when the cover is opened, so that if the cover should inadvertently be opened while hot water is being sprayed into the sterilizing compartment, the solenoid valve 15 will be instantly closed and the supply of water to the spray nozzles shut off.

The cabinet may be provided with a wash tank 36a at one side of the sterilizing compartment, and wash tank 36a has a drain 37, while 38 and 39 designate pipes connecting the cold and hot water lines respectively with faucets in the wash tank to permit preliminary cleansing of the glasses or dishes before they are placed within the sterilizing compartment.

It is within the scope of the invention to introduce a suitable detergent into the tempering chamber 10, or otherwise into the hot sterilizing water so that the first action of the water is to cleanse the glasses by application of soap or other agent, after which the sterilizing operation is completed for the predetermined period of time, depending on the operation of the solenoid valve 15, following which the glasses are cooled in the manner already described.

The operation of the mechanism briefly is as follows: The glasses, steins, or dishes can be preliminarily washed in the tank 36a or otherwise, and are then positioned in the basket or tray 4 which is inserted into the machine, resting on the supports 5, and the cover 3 is closed, automatically closing the valve control timer circuit through switch 36. The timer is adjusted for the required sterilizing and cooling periods, and switch 23 is then closed. The valve control circuit then automatically opens the hot water solenoid valve 15, permitting hot water in the tempering chamber 10 to pass to the spray nozzles in the sterilizing compartment at an initially lower temperature, followed by water from the main heating supply tank 12 in which the water is constantly kept at a temperature of 180° F. by the electric heating unit and thermostat control. A detergent may be added by any suitable mechanism to the water in the tempering chamber 10 before it is forced into the sterilizing compartment, and the water in the tempering chamber 10 which first passes to the sterilizing compartment is at a somewhat lower temperature than that of the water in the main heating supply tank due to the conductor 27 containing the cold water supply. After a predetermined period of time, the hot water solenoid valve 15 is closed by the timer 22 and the cold water solenoid valve 30 is automatically opened, to admit cooling water to the spray nozzles in the sterilizing compartment, and the initial supply of cooling water is at a somewhat higher temperature than the normal temperature of the cold water, owing to the location of the conductor 27 in the tempering chamber, the hot water in the chamber acting to raise the temperature of the cold water in the conductor 27. Thus the cooling water which initially contacts the glasses is at a temperature somewhat higher than the normal cold water supply, and the temperature of the cooling water is gradually reduced to cool the glasses and permit their immediate use for serving without danger of breakage.

While the invention has been described in relation to the specific structural embodiment shown, it is not confined to the arrangement or details disclosed, and this application is intended to cover such modifications or departures as may come within the purposes of the improvement and the scope of the following claims.

I claim:

1. Apparatus for sterilizing and cooling glasses, dishes, or the like including a sterilizing compartment, spray means in the sterilizing compartment, a hot water supply tank, electric heating means in said tank for maintaining the water at a predetermined temperature, a tempering chamber, a pipe connecting said tank and tempering chamber, a pipe connecting the tempering chamber with said spray means, a cold water conductor located in heat-exchange relation to said tempering chamber, and a cold water pipe leading to said cold water conductor, said cold water conductor being connected to said pipe leading to the spray means.

2. Apparatus for sterilizing and cooling glasses, dishes, or the like including a sterilizing compartment, spray means in the sterilizing compartment, a hot water supply tank, electric heating means in said tank for maintaining the water at a predetermined temperature, a tempering chamber, a pipe connecting said tank and tempering chamber, a pipe connecting the tempering chamber with said spray means, a cold water conductor located within said tempering chamber and extending therethrough, a cold water supply pipe leading to said conductor, and a pipe leading from said conductor to the aforementioned pipe connected with the spray means.

3. Apparatus for sterilizing and cooling glasses, dishes, or the like including a sterilizing compartment, spray means in the sterilizing compartment, a hot water supply tank, electric heating means in the hot water tank for maintaining the water at a predetermined temperature, a tempering chamber, a pipe connecting said tank and tempering chamber for conveying hot water from the tank to the tempering chamber, a pipe connecting the tempering chamber with said spray means, a cold water conductor, a cold water supply pipe leading to said conductor, said cold water conductor being located in heat-exchange relation to said tempering chamber and connected to said pipe leading to the spray means, an electric time-controlled valve located in the hot water pipe between said tank and the tempering chamber, an electric time-controlled valve located in the cold water pipe, and electric timing mechanism governing said valves.

4. Apparatus for sterilizing and cooling glasses, dishes, or the like including a sterilizing compartment, spray means in the sterilizing compartment, a hot water supply tank, electric heating means in the tank for maintaining the water at a predetermined temperature, a tempering chamber, a pipe connecting said tank and tempering chamber for conveying hot water from the tank to the tempering chamber, a pipe connecting the tempering chamber with said spray means, a cold water conductor located within said tempering chamber and extending therethrough, a cold water supply pipe connecting with said conductor, a pipe leading from said conductor to said pipe connected with the spray means, an electric time-controlled valve located in the pipe between said hot water tank and the tempering chamber, an electric time-controlled valve located in the cold water pipe, and electric timing mechanism governing said valves.

CARMELO V. DI PIETRO.

REFERENCES CITED

The following references are of record in the file of this patent:

UNITED STATES PATENTS

| Number    | Name      | Date          |
|-----------|-----------|---------------|
| 1,186,944 | Rice      | June 13, 1916 |
| 2,345,721 | Allstatter| Apr. 4, 1944  |
| 2,090,261 | Mitchell  | Aug. 17, 1937 |

FOREIGN PATENTS

| Number  | Country | Date         |
|---------|---------|--------------|
| 734,412 | France  | Aug. 1, 1932 |